United States Patent [19]

Jensen

[11] 3,871,717

[45] Mar. 18, 1975

[54] HYDRAULICALLY OPERATED BRAKE PRESSURE MODULATOR

[75] Inventor: Kenneth D. Jensen, Owosso, Mich.

[73] Assignee: Midland-Ross Corporation, Cleveland, Ohio

[22] Filed: Sept. 7, 1973

[21] Appl. No.: 395,267

[52] U.S. Cl............ 303/21 AF, 188/181 A, 303/10, 303/21 F, 303/68
[51] Int. Cl. ......................... B60t 8/06, B60t 13/16
[58] Field of Search .......... 303/21 AF, 21 F, 61–63, 303/10, 68–69; 188/181 A

[56] References Cited
UNITED STATES PATENTS

| | | | |
|---|---|---|---|
| 3,637,057 | 1/1972 | Okamoto............................ | 303/21 F |
| 3,747,990 | 7/1973 | Tanguy........................... | 303/21 AF |
| 3,790,228 | 2/1974 | Adahan............................. | 303/21 F |
| 3,801,160 | 4/1974 | Schafer et al..................... | 303/21 F |
| 3,810,680 | 5/1974 | Schenk............................. | 303/21 F |
| 3,813,130 | 5/1974 | Inada........................... | 303/21 A FX |

*Primary Examiner*—George E. A. Halvosa
*Assistant Examiner*—D. C. Butler
*Attorney, Agent, or Firm*—Irvin L. Groh

[57] ABSTRACT

A hydraulically operated brake pressure modulator having a piston acted on by a secondary source of pressure for varying the volume of the hydraulic brake system to relieve and to apply the brakes during an antiskid mode of operation. The piston incorporates a valve control arrangement for operating a master cylinder isolating valve and also a valve bar closing communication from the secondary source of fluid pressure to the variable pressure chamber adjacent the piston to trap fluid in the chamber and prevent retraction of the piston which otherwise would increase the volume of the brake system.

11 Claims, 1 Drawing Figure

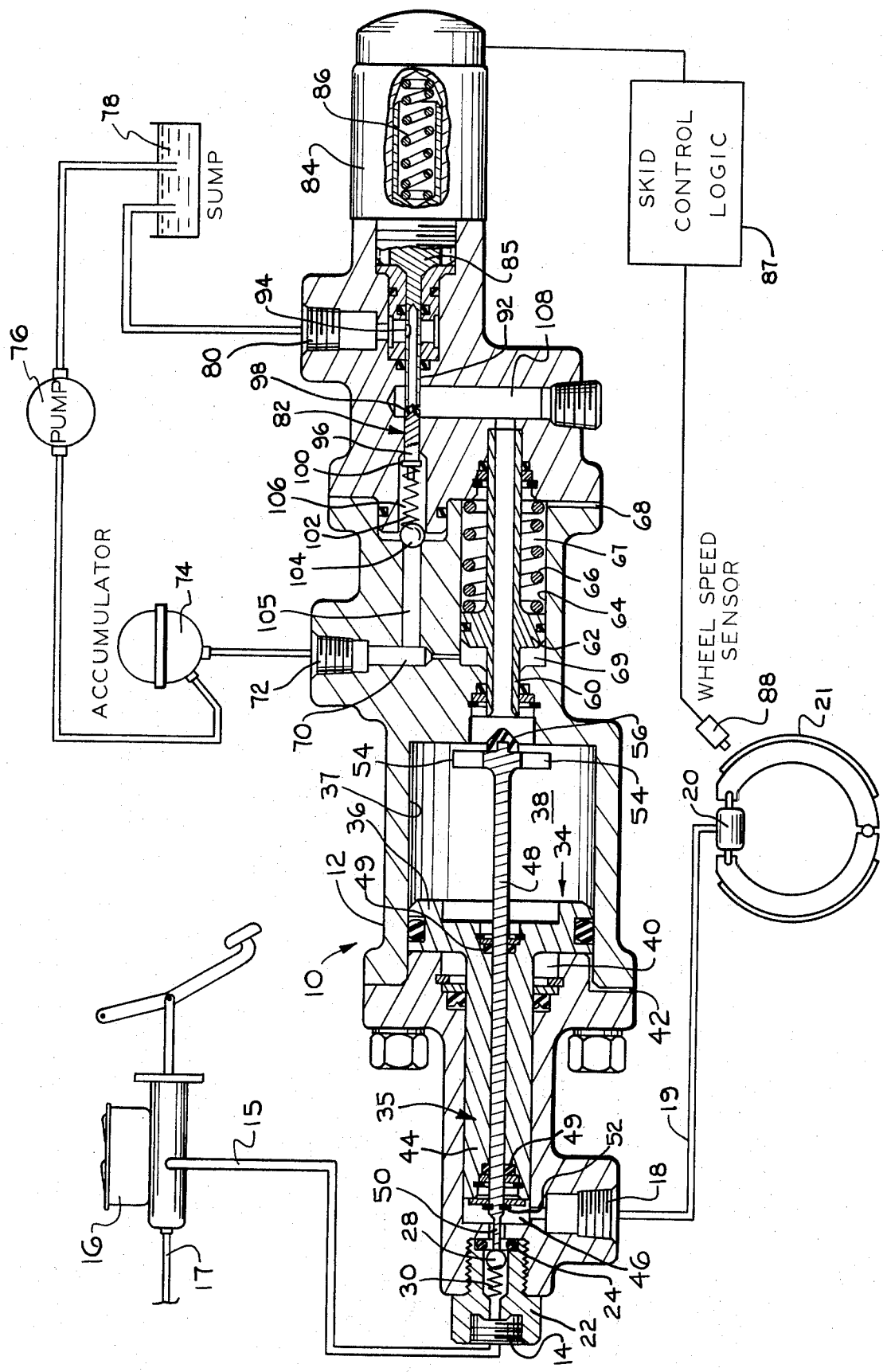

HYDRAULICALLY OPERATED BRAKE PRESSURE MODULATOR

BACKGROUND OF THE INVENTION

This invention relates to hydraulic brake pressure modulators for antiskid brake systems and more particularly, to such modulators employing a secondary source of hydraulic fluid for operating the modulator.

Modulators for hydraulic brake systems commonly use an actuator having a piston means movable in one direction to first isolate the brake applying master cylinder from the remainder of the brake system and to increase the volume in the hydraulic brake line to the braked wheel to decrease the brake applying pressure and thereafter move in the opposite direction to decrease the volume to increase the pressure and reapply the brakes. Such modulator pistons usually act against a spring having a force sufficient to hold the piston means in a position maintaining the master cylinder in communication with the braked wheel when fluid pressure is unavailable from a pressure source to operate the piston means. The force of the spring must be large enough to overcome the maximum expected brake pressure and, as a consequence, the spring must be of substantial size and force which detracts from the rapid response of the modulator. The capability of rapid response is important in antiskid brake modulators since the modulator piston usually reciprocates to the order of seven cycles per second during an antiskid mode of operation.

In an effort to overcome the problem resulting from the use of a large spring, modulators have been proposed that attempt to isolate the modulator piston from the valve which isolates the master cylinder from the remainder of the brake system. Such devices, however, use a multiplicity of valves and solenoids to operate the valves which makes the units complex and costly. In addition, upon failure of the secondary fluid pressure source, the valving must be operated to restore the master cylinder and hydraulic brake system to its original condition and particularly to restore the original fluid volume of the brake system to the volume existing prior to the antiskid control mode of operation. This is dangerous if failure of the secondary pressure source should occur during the antiskid mode of operation at a time when the volume of the brake system has been decreased. Restoration of the original volume at such a time plus opening communication between the master cylinder and the brake system can result in abrupt braking with an excessive force which would be hazardous.

SUMMARY OF THE INVENTION

It is an object of the invention to provide an antiskid brake pressure modulator which employs a secondary fluid pressure source to control a hydraulic brake system during an antiskid mode of operation and upon failure of the secondary pressure source, will restore the principal hydraulic brake system to a safe condition of operation even if failure of the secondary pressure source should occur during an antiskid mode of operation.

It is another object of the invention to provide an antiskid brake pressure modulator which operates upon failure of the secondary pressure source during an antiskid mode of operation to restore the system to a safe operating condition without requiring the volume of the hydraulic brake system to be reestablished before the master cylinder connection is reestablished to the brake system thereby avoiding abrupt braking.

Still another object of the invention is to provide an antiskid brake pressure modulator in which the need for a large piston return spring to insure opening of the master cylinder isolating valve is eliminated.

These objects are achieved by a mechanism employing a piston assembly having a separate valve control rod for opening and closing the master cylinder isolating valve and also for operating an additional valve operative to trap fluid in the variable pressure chamber acting on the modulator piston to lock the piston in a position preventing increased volume of the brake applying system. The valve control rod is operative independently of the piston during the fail-safe mode of operation to open the master cylinder isolating valve and reestablish the usual braking conditions.

DESCRIPTION OF THE DRAWING

The drawing is a cross-sectional view of an antiskid brake pressure modulator embodying the present invention with various associated components of the brake system and the wheel lock sensing circuit shown schematically.

DETAILED DESCRIPTION OF THE DRAWING

Referring to the drawing, the antiskid brake pressure modulator 10 includes an elongated housing 12 which has an inlet port 14 for hydraulic connection through a line 15 to a conventional master cylinder 16. The master cylinder 16 also may be connected through a line 17 to another modulator 10. The housing 12 also has an outlet port 18 which is connected through a line 19 to a wheel cylinder 20 for hydraulically operating the brake mechanism 21 at a wheel of a vehicle.

The inlet 14 is formed in a generally tubular fitting 22 which is threaded into one end of the housing 12 and holds an O-ring 24 in position where it acts as a valve seat. The fitting 22 forms a housing for a ball check valve 28 and a relatively light spring 30 which urges the ball valve 28 towards its seat 24. In the position shown in the drawings, the valve 24, 28 is open to permit free fluid communication between the master cylinder 16 and the wheel cylinder 20 for the usual application and release of the brake mechanism 21 at the wheel. When the valve 24, 28 is closed it acts to isolate the master cylinder 16 from the remainder of the brake system.

The opening and closing of the master cylinder isolating valve 28 relative to its seat 24 is under the control of a modulator piston assembly 34 which includes a compound piston member 35 slidable in the housing 12. The compound piston member 35 includes a large piston portion 36 slidably seated in a large bore 37 and forms a control chamber 38 at one side and a cavity 40 at the opposite side. The cavity 40 is in constant communication with the atmosphere by way of a vent 42.

A smaller piston portion 44 of the compound piston 35 forms a chamber 46 which receives hydraulic fluid from the master cylinder 16 through the open check valve 28 and permits its passage to the outlet port 18 during application of the brakes.

The compound piston assembly 35 also includes a valve control rod 48 which is supported coaxially and sealed by seals 49 in the compound piston for sliding movement relative to piston 35. The rod 48 is provided with an extension 50 which is engageable with the ball 28. A snap-ring 52 is seated on the control rod 48 and acts as a stop to engage the end of the smaller piston 44 when the latter is at its extreme left position as shown in the drawing so that the extension 50 engages the ball valve 28 and holds it off the seat 24 to permit free hydraulic fluid passage between the inlet 14 and the outlet 18. The opposite end of the rod 48 is provided with a plurality of radially extending fingers 54 which are engageable with an internal wall of the chamber 38 to limit the movement of the rod 48 toward the right. The end of the rod 48 is also provided with a conical valve element 56 of a resilient material which, under certain conditions of operation, is adapted to close the open end of a tubular member 60.

The tubular member 60 has its opposite ends slidably sealed in the housing 12 and an intermediate portion is provided with a piston portion 62 which also is sealed in a bore 64 for sliding movement. A spring 66 surrounds the tubular member 60 and acts between the piston 62 and an internal wall in the bore 64 to urge the piston 62 towards the left as seen in the drawing. A cavity 67 is formed by the bore 64 to the right of the piston 62 and is constantly vented to atmosphere by way of a passage 68. A chamber 69 formed in the bore 64 to the left of the piston 62 communicates through a passage 70 with a fluid pressure supply port 72 which is adapted for connection with a secondary source of fluid pressure.

The secondary source of fluid pressure can be of any one of a number of hydraulic pressure sources such as the power steering system of a vehicle, for example. In the drawing, however, the secondary source is illustrated by an accumulator 74 which receives pressurized fluid from a pump 76 connected to a sump 78. The brake pressure modulator utilizes the hydraulic fluid from the accumulator 74 to operate the brake pressure modulator 10 and fluid which is utilized by the latter is exhausted by way of an exhaust port 80 to the sump 78.

The delivery of fluid to the supply port 72 and the exhaust of fluid from the exhaust port 80 during operation of the brake pressure modulator 10 is under the control of a valve assembly indicated generally at 82. The valve assembly 82 is actuated by a solenoid 84 which includes a plunger 85 biased by a spring 86 toward the left as viewed in the drawing. When the solenoid is energized, the plunger 85 moves to the right to compress the spring 86 and when the solenoid is deenergized the spring 86 returns the plunger to the position in which it is shown in the drawing.

The solenoid 84 is energized and deenerized in response to a signal received from a skid control logic unit 87 which receives wheel speed information from a speed sensor 88 associated with the wheel of the vehicle.

The solenoid 84 is provided with a hollow stem portion 92 formed integrally with the plunger 85 and having a radial passage 94 communicating the interior of the hollow stem 92 with exhaust port 80. The open end of the stem 92 is normally closed by one end of a needle valve member 96. One end of the needle valve member 96 forms the modulator exhaust valve 98 and the opposite end forms a modulator supply valve 100. The needle valve is normally urged to the right as seen in the drawing so that the exhaust valve 98 is seated in the open end of the tubular member 92 by means of a spring 102 which acts between the needle valve elements 96 and a ball valve 104 to urge the needle valve 96 and ball valve 104 in opposite directions. The ball valve 104 controls the opening in a passage 105 between the supply port 72 and a cavity 106 containing the spring 102. The ball valve 104 acts as a check valve to permit fluid flow from the supply port 72 to the cavity 106 but prohibits the flow of fluid pressure in the opposite direction.

The needle valve 96 is fitted loosely in its passage to permit free fluid flow from the cavity 106 to a cross passage 108 which communicates with the interior of the tubular member 60. Consequently, hydraulic fluid from the secondary fluid pressure source 74 is free to enter the supply port 72 and flow through passage 105 and the open check valve 104 to the cavity 106, around the needle valve 96 to the passage 108 and through the tubular member 60 to the modulator chamber 38 at the right side of the compound piston 34.

OPERATION

When a vehicle employing the brake pressure modulator 10 of the present invention is operated in the usual manner with the brakes released and the secondary pressure source in operation, the elements of the modulator 10 are disposed in the position shown in the drawing. The pressure of the brake fluid in the chamber 46 is at a minimum or at a residual pressure. The chamber 40 and the chamber 64 are at atmospheric pressure and the chambers 38, 69 and 102 and the various associated passageways are at the accumulator pressure. Brake applications made under these conditions at all hydraulic brake pressures below those necessary to lock at wheel being braked will not cause any movement of any of the internal elements of the antiskid control modulator since the compound piston 34 is restrained from any movement by the fluid trapped in the chamber 38. Such trapped fluid pressure cannot escape to the accumulator because of the one way ball check valve 104 or to the exhaust port 80 because of the closed needle valve 98.

When the brakes are applied to a pressure that would ordinarily cause the wheel 21 to lock, the wheel speed sensor 88 delivers wheel speed information to the skid control unit 87 which results in energization of the solenoid 84. This causes the hollow stem member 92 to move to the right as seen in the drawing. The initial increment of movement closes valve 100 on its seat and traps fluid under pressure in the chamber 69 which acts to prevent any leftward movement of the piston 62 and maintains the spring 66 in a compressed state. Additional movement of the stem member 92 to the right opens the valve 98 which allows the fluid in modulator chambers 38 to escape to the pump 78 by way of the hollow tubular member 60, the passage 108, through the open stem 98, the passage 94 and the exhaust outlet port 80. The reduction of pressure in the chamber 38 permits the compound piston 34 to move to the right in response to the brake fluid pressure in chamber 46 acting on the face of the small piston 44. The control rod 48 moves with the compound piston 34 under the influence of fluid pressure in the chamber 46 which acts on the rod over an area defined by the seal 49. The movement of the rod 48 to the right together with the piston 34 continues until ball 28 closes on its seat 24. This isolates the master cylinder 16 and interrupts any further fluid communication to the wheel cylinder 20. Any change in brake fluid pressure in the chamber 46, and consequently at the wheel cylinder 20, is thereafter under the control of the brake pressure modulator 10.

After the ball valve 28 has closed in response to the initial operation of the brake pressure modulator 10, the movement of the rod 48 to the right is limited by engagement of the radial fingers 54 with the end wall of the cylinder bore 37. This engagement occurs before the valve element 56 closes the open end of the tubular member 60 thereby retaining open communication between the modulator chamber 38 and the passage 108 communicating with the exhaust port 80. The compound piston 34, however, can continue movement to the right relative to the stationary rod 48 and such movement continues until the pressure in the hydraulic brake chamber 46 is reduced to a level below that at which a wheel lock condition would occur. As the wheel begins to resume rotation, the signal to reapply the brakes is processed in the skid control logic unit 87 in the usual manner and results in the deenergization of the solenoid 84.

Deenergization of the solenoid 84 causes the spring 86 to move the hollow stem 92 toward the left. The first increment of movement brings the outlet valve 98 into closing engagement with the end of the stem 92 to isolate the modulator chamber 38 from the exhaust port 80. Subsequent increments of movement cause the inlet valve 100 to open and to permit accumulator fluid pressure to be supplied from the inlet port 72 to the modulator chamber 38. This causes the piston assembly 34 to move to the left to reduce the volume of the chamber 46 and thereby increase the pressure of the brake fluid supplied to the wheel cylinder 20. During this piston movement, the rod 48 remains in its position with fingers 54 engaging the wall at the right end of the bore 37. This sequence of energization and deenergization of the solenoid 84 and operation of the valving ordinarily occurs at a frequency of several cycles per second during the time that the brake pressure modulator is operating in the skid mode of operation.

In the event of loss of the secondary source of fluid pressure, the tubular member 60 and piston portion 62 act as a fail-safe valve means to insure that normal braking by way of the master cylinder is maintained. Failure of the secondary pressure source can occur during normal operations by the operator or during the time that the modulator 10 is controlling the brakes in the anti-skid brake control mode of operation. In either case the operation of the fail-safe valve means is substantially the same. When there is a loss of pressure in the secondary source, the same loss occurs at the supply port 72 and therefore in the chamber 69. This allows the spring 66 to move the fail-safe valve means formed by the tubular member 60 and piston portion 62 toward the left to bring the valve seat formed by the open end of the tubular member 60 into seating engagement with the valve closure element 56. This traps the fluid remaining in the modulator chamber 38 and insures that the compound piston 35 remains in the normal position shown in the drawing to hold the rod member 48 in its extreme leftward position so that the projection 50 engages the isolating valve element 28 and holds it off of its seat 24. If, however, the failure of the pressure source has occurred in a manner such that the compound piston 35 is in a position to the right of that shown in the drawing, as might occur during antiskid brake operations, the tubular member 60 is effective to move the control rod 48 to the left relative to the stationary compound piston to hold the isolating valve element 28 off of its seat 24. The fluid which is trapped in the chamber 38 acts as a solid column to prevent any additional movement of the piston 34 to the right. Under these conditions, the hydraulic brake cavity 46 will be somewhat larger than usual but its volume will not fluctuate and, as a consequence, will have a negligible effect on subsequent braking operations which can be carried out in the usual manner by the operation of the master cylinder 16 through the open isolating valve 24, 28 to apply and release brake pressure at the wheel cylinder 18.

It will be understood that the spring 66 is selected of a value large enough to overcome the effect of hydraulic braking pressure acting in the chamber 46 on the rod 48. Also, the size of the piston 62 and the minimum operating pressure of the secondary fluid pressure source determines the size of the piston 62 required to maintain the spring 66 in a compressed state. The ratio between this minimum operating pressure in the secondary pressure source 74 and the maximum brake fluid pressure capability acting in the chamber 46 determines the effective area relationships between the diameters of the large pistons 36 and the small piston 44.

It will now be seen that a brake pressure modulator has been provided which utilizes a secondary source of fluid pressure for its operation and, in the event of failure of the pressure source, the modulator operates automatically to maintain or to return the hydraulic brake system to its usual operating condition. Moreover, even if such failure of the secondary fluid pressure source should occur during the skid controlled mode of operation, the modulator functions in substantially the same manner to return the hydraulic brake system to its usual operating condition.

What is claimed is:

1. An antiskid brake pressure modulator having an inlet adapted for connection to a brake master cylinder and an outlet adapted for connection to a brake wheel cylinder and being operable in response to a sensed condition at a wheel to be braked and comprising; isolating valve means having a closed position for isolating said inlet from said outlet, piston means movable to form a variable volume chamber at one side between said valve means when the latter is in its closed position and said outlet, said piston means forming a variable pressure chamber at another side of said piston means, a source of secondary fluid pressure communicating with said variable pressure chamber for acting on said piston means and moving the latter between first and second positions to vary the volume of said variable volume chamber, a valve control member supported for movement relative to said piston means between a first position in which said control member maintains said isolating valve open and a second position in which said isolating valve is closed, and a fail-safe member slidably supported axially of said valve control member and having a normal position spaced from the latter in the presence of pressure at said secondary pressure source to communicate pressure to said variable pressure chamber and being movable to a second position in the absence of pressure at said secondary source to engage said valve control member and isolate said variable pressure chamber from said source and move said control member to its first position.

2. The combination in claim 1 in which said valve and fail-safe control members include valve means between said secondary source and said variable pressure chamber and in which said valve means is open when said fail-safe member is in its normal position and closed when said fail-safe member is in its said second position to isolate said variable pressure chamber and maintain said piston stationary.

3. The combination in claim 1 in which said piston means engages said valve control member and maintains the latter in its said first position when said piston means is in said first position.

4. The combination in claim 1 in which said fail-safe member includes a piston portion forming a control cavity at one side thereof in communication with said secondary source, said piston being urged to said normal position in the presence of pressure at said secondary source.

5. The combination in claim 4 in which said fail-safe member includes biasing said piston portion from its said normal position toward its said second position.

6. The combination in claim 4 in which said piston portion forms a passage therethrough communicating said variable pressure chamber with said secondary source when said passage is open and said fail-safe member is in said normal position and in which said passage is closed by said valve control member when said fail-safe member is in said second position.

7. A brake pressure modulator for use in a hydraulic brake system including a master cylinder and a brake applying wheel cylinder and being operable by a secondary source of fluid pressure in response to a sensed condition at a wheel to be braked, the combination of: a housing having an inlet and outlet adapted to be connected to said master cylinder and wheel cylinder, respectively; said housing having a supply port and an exhaust port adapted for connection to the secondary source of fluid pressure; isolating valve means for isolating said inlet from said outlet; a piston slidably supported in said housing and forming a variable volume chamber at one side thereof between said isolating valve means and said outlet, said piston being movable in opposite directions to vary the volume of said variable volume chamber, said piston forming a variable pressure chamber at the opposite side thereof in fluid communication with said supply port, said piston being movable in opposite directions solely in response to pressure in said variable volume chamber and in said variable pressure chamber, said piston normally being disposed in a first position in the presence of pressure from said secondary source to maintain said variable volume chamber at a minimum and being movable in the opposite direction toward a second position upon a decrease in pressure at said supply port to increase the volume of said variable volume chamber; a control member slidably supported relative to said piston for movement therewith and relative thereto, said control member normally engaging and holding said isolating valve means in an open position and being movable to another position upon movement of said piston toward its second position to close said isolating valve means, and fail-safe valve means normally open in the presence of pressure at said supply port to maintain communication between said supply port and said variable pressure chamber, said fail-safe valve means being movable to a closed position upon the failure of pressure at said supply port to isolate said variable pressure chamber therefrom and maintain said piston in a stationary position between its first and second positions during movement of said control member relative to said piston by said fail-safe valve means to the normal position of said control member.

8. The combination of claim 7 and further comprising additional valve means between said supply and exhaust ports, said additional valve means normally opening said variable pressure chamber to said supply port and closing said variable pressure chamber to said exhaust port, said additional valve means being movable in response to a sensed condition to isolate said variable pressure chamber from said supply port and communicate it with said exhaust port.

9. The combination in claim 7 in which said fail-safe valve means includes a piston portion forming a control cavity at one side thereof in communication with said supply port and in which pressure therein urges said fail-safe valve means to its said normal position.

10. The combination in claim 9 and further comprising means biasing said piston portion toward its said second position.

11. A brake pressure modulator for use in a hydraulic brake system including a master cylinder and a brake applying wheel cylinder and being operable by a secondary source of fluid pressure in response to a sensed condition at a wheel to be braked, the combination of: a housing having an inlet and outlet adapted to be connected to said master cylinder and wheel cylinder, respectively; said housing having a supply port and an exhaust port adapted for connection to the secondary source of fluid pressure; isolating valve means for isolating said inlet from said outlet; a piston slidably supported in said housing and forming a variable volume chamber at one side thereof between said isolating valve means and said outlet, said piston being movable in opposite directions to vary the volume of said variable volume chamber, said piston forming a variable pressure chamber at the opposite side thereof in fluid communication with said supply port, said piston normally being positioned in the presence of pressure from said secondary source to maintain said variable volume chamber at a minimum and being movable in the opposite direction upon a decrease in pressure at said supply port to increase the volume of said variable volume chamber; a control member slidably supported relative to said piston for movement therewith and relative thereto, said control member normally engaging and holding said isolating valve means in an open position and being movable to another position upon movement of said piston toward its second position to close said isolating valve means, and fail-safe valve means including a tubular member communicating said variable pressure chamber with said supply port, said tubular member having a pressure responsive portion acted on by the pressure at said supply port to maintain communication between said supply port and said variable pressure chamber, said fail-safe valve means being movable to a closed position in the absence of pressure at said supply port to isolate said variable pressure chamber therefrom and maintain said piston in a stationary position during movement of said control member by said fail-safe valve means to the normal position of said control member.

* * * * *